United States Patent
Gupta et al.

(10) Patent No.: US 11,016,692 B2
(45) Date of Patent: May 25, 2021

(54) DYNAMICALLY SWITCHING BETWEEN MEMORY COPY AND MEMORY MAPPING TO OPTIMIZE I/O PERFORMANCE

(71) Applicant: International Business Machines Corporation, Armonk, NY (US)

(72) Inventors: Lokesh M. Gupta, Tucson, AZ (US); Kevin J. Ash, Tucson, AZ (US); Brian A. Rinaldi, Tucson, AZ (US); Kyler A. Anderson, Sahuarita, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 16/567,747

(22) Filed: Sep. 11, 2019

(65) Prior Publication Data

US 2021/0072918 A1 Mar. 11, 2021

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0613* (2013.01); *G06F 3/0673* (2013.01);
(Continued)

(58) Field of Classification Search
CPC .... G06F 3/0647; G06F 3/0613; G06F 3/0673; G06F 12/0646; G06F 13/4204;
(Continued)

(56) References Cited

U.S. PATENT DOCUMENTS

| 8,966,133 B2 * | 2/2015 | Hart .................. G06F 13/28 710/26 |
| 9,432,298 B1 | 8/2016 | Smith |

(Continued)

OTHER PUBLICATIONS

Lee, Shin-Ying, "Intelligent Scheduling and Memory Management Techniques for Modern GPU Architectures," a Dissertation Presented in Partial Fulfillment of the Requirements for the Degree Doctor of Philosophy, Arizona State University, Jul. 2017.

(Continued)

*Primary Examiner* — Mark A Giardino, Jr.
(74) *Attorney, Agent, or Firm* — Nelson and Nelson; Daniel P. Nelson (57) ABSTRACT

A method to dynamically switch between data transfer techniques includes receiving an I/O request and computing a cost of executing the I/O request using a memory copy data transfer technique. The memory copy data transfer technique copies cache segments associated with the I/O request from cache memory to a permanently mapped memory, which is permanently mapped to a bus address window. The method also computes a cost of executing the I/O request using a memory mapping data transfer technique. The memory mapping data transfer technique temporarily maps cache segments associated with the I/O request from the cache memory to the bus address window. The method uses one of the memory copy data transfer technique and the memory mapping data transfer technique to transfer cache segments associated with the I/O request, depending on which one is less costly. A corresponding system and computer program product are also disclosed.

20 Claims, 10 Drawing Sheets

(51) Int. Cl.
*G06F 12/06* (2006.01)
*G06F 13/42* (2006.01)
*G06F 13/16* (2006.01)
*G06F 13/00* (2006.01)
*G06F 13/28* (2006.01)

(52) U.S. Cl.
CPC ...... *G06F 12/0646* (2013.01); *G06F 13/1668* (2013.01); *G06F 13/4204* (2013.01); *G06F 2212/1024* (2013.01); *G06F 2212/608* (2013.01); *G06F 2213/0024* (2013.01)

(58) Field of Classification Search
CPC ......... G06F 13/1668; G06F 2213/0024; G06F 2212/1024; G06F 2212/608
See application file for complete search history.

(56) References Cited

U.S. PATENT DOCUMENTS 10,268,583 B2   4/2019   Beers et al.
2007/0239905 A1*  10/2007  Banerjee .............. H04L 69/32
                                                    710/22
2019/0171581 A1   6/2019   Flynn et al.

OTHER PUBLICATIONS

Anonymously, "A Method to Improve Network Switch Performance of Large Data Blocks in Storage Network," IP.com No. IPCOM000254570D, Jul. 12, 2018.
Anonymously, "Method for enhanced application performance during storage migrations in multi-tier storage environment," IP.com No. IPCOM000254599D, Jul. 17, 2018.
McDavitt, Ben, et al., "System for Supporting a Container-Based Application on a Storage System" IP.com No. IPCOM000257716D, Mar. 5, 2019.
EMC Corporation, "EMC VPLEX: Elements of Performance and Testing Best Practices Defined," EMC White Paper, available at: https://www.emc.com/collateral/white-papers/h11299-emc-vplex-elements-performance-testing-best-practices-wp.pdf, 2012.

* cited by examiner

DYNAMICALLY SWITCHING BETWEEN MEMORY COPY AND MEMORY MAPPING TO OPTIMIZE I/O PERFORMANCE

BACKGROUND

Field of the Invention

This invention relates to systems and methods for dynamically switching between memory copy and memory mapping techniques to optimize I/O performance in storage systems.

Background of the Invention

A Peripheral Component Interconnect (PCI) host bridge may enable communication between a processor and an input/output (I/O) subsystem within a data processing system. The PCI host bridge provides data buffering capabilities to enable read and write data to be transferred between the processor and the I/O subsystem. The I/O subsystem may be a group of PCI devices connected to a PCI bus. When a PCI device on the PCI bus originates a read or write command to a system memory via a direct memory access (DMA), the PCI host bridge translates a PCI address of the DMA to a system memory address of the system memory.

Each PCI device on the PCI bus may be associated with a corresponding translation control entry (TCE) table resident within the system memory. The TCE table may be utilized to perform TCE translations from PCI addresses to system memory addresses. In response to a DMA read or write operation, a corresponding TCE table is read by the PCI host bridge to provide a TCE translation.

In storage systems such as the IBM DS8000™ enterprise storage system, each I/O that is processed by the storage system requires mapping cache memory of the storage system one or more times. For example, a read hit to the cache memory requires creation of a TCE mapping so that a host adapter can read the cache memory via a DMA. This TCE mapping is then unmapped after the DMA is complete. In the case of a read miss, two TCE mappings are required: one mapping between the cache memory and a device adapter in order to retrieve the read data from storage drives, and a second mapping between the cache memory and a host adapter in order to return the read data to a host system. After the DMAs are complete, the TCE mappings may be unmapped.

In view of the foregoing, what are needed are alternative data transfer techniques for transferring data within storage systems such as the IBM DS8000™ enterprise storage system. Further needed are systems and methods to dynamically switch between several data transfer techniques to optimize I/O performance in storage systems such as the IBM DS8000™ enterprise storage system.

SUMMARY

The invention has been developed in response to the present state of the art and, in particular, in response to the problems and needs in the art that have not yet been fully solved by currently available systems and methods. Accordingly, embodiments of the invention have been developed to dynamically switch between memory copy and memory mapping data transfer techniques to improve I/O performance. The features and advantages of the invention will become more fully apparent from the following description and appended claims, or may be learned by practice of the invention as set forth hereinafter.

Consistent with the foregoing, a method is disclosed to dynamically switch between memory copy and memory mapping data transfer techniques to improve I/O performance. The method receives an I/O request and computes a cost of executing the I/O request using a memory copy data transfer technique. The memory copy data transfer technique copies cache segments associated with the I/O request from cache memory to a permanently mapped memory, which is permanently mapped to a bus address window. The method also computes a cost of executing the I/O request using a memory mapping data transfer technique. The memory mapping data transfer technique temporarily maps cache segments associated with the I/O request from the cache memory to the bus address window. The method uses one of the memory copy data transfer technique and the memory mapping data transfer technique to transfer cache segments associated with the I/O request, depending on which one is less costly.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
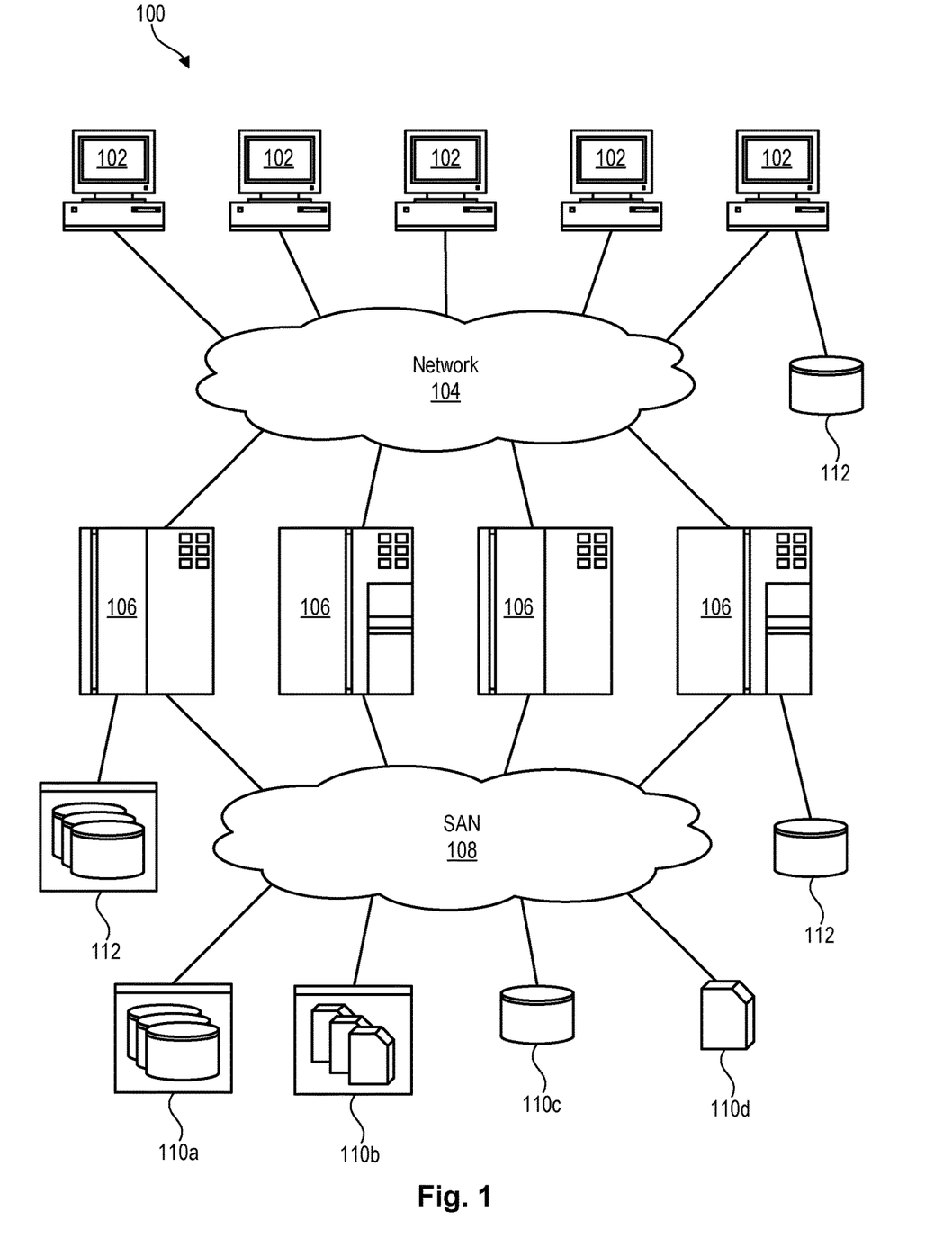
FIG. 1 is a high-level block diagram showing one example of a network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
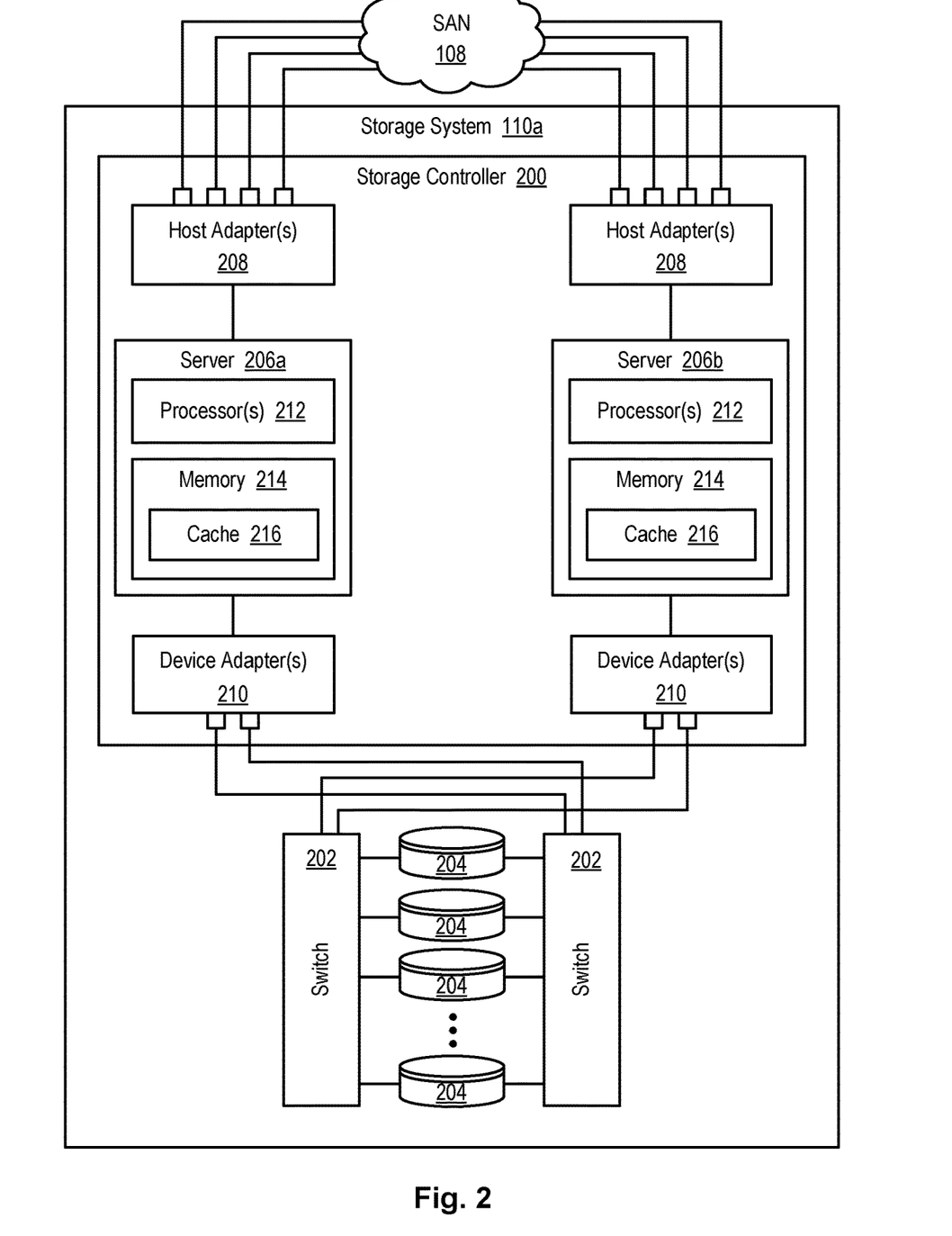
FIG. 2 is a high-level block diagram showing one embodiment of a storage system for use in the network environment of FIG. 1.

Referring to FIG. 2, one example of a storage system 110a containing an array of hard-disk drives 204 and/or solid-state drives 204 is illustrated. The internal components of the storage system 110a are shown since systems and methods in accordance with the invention may be implemented within such a storage system 110a. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In certain embodiments, the memory 214 includes a cache 216, such as a DRAM cache 216. Whenever a host 106 (e.g., an open system or mainframe server) performs a read operation for data that is not resident in cache 216, the server 206 that performs the read may fetch data from the storage drives 204 and save it in its cache 216 in the event it is needed again. If the data is requested again by a host system 106, the server 206 may fetch the data from the cache 216 instead of fetching it from the storage drives 204, saving both time and resources. Similarly, when a host system 106 performs a write, the server 206 that receives the write request may store the modified data in its cache 216, and destage the modified data to the storage drives 204 at a later time.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
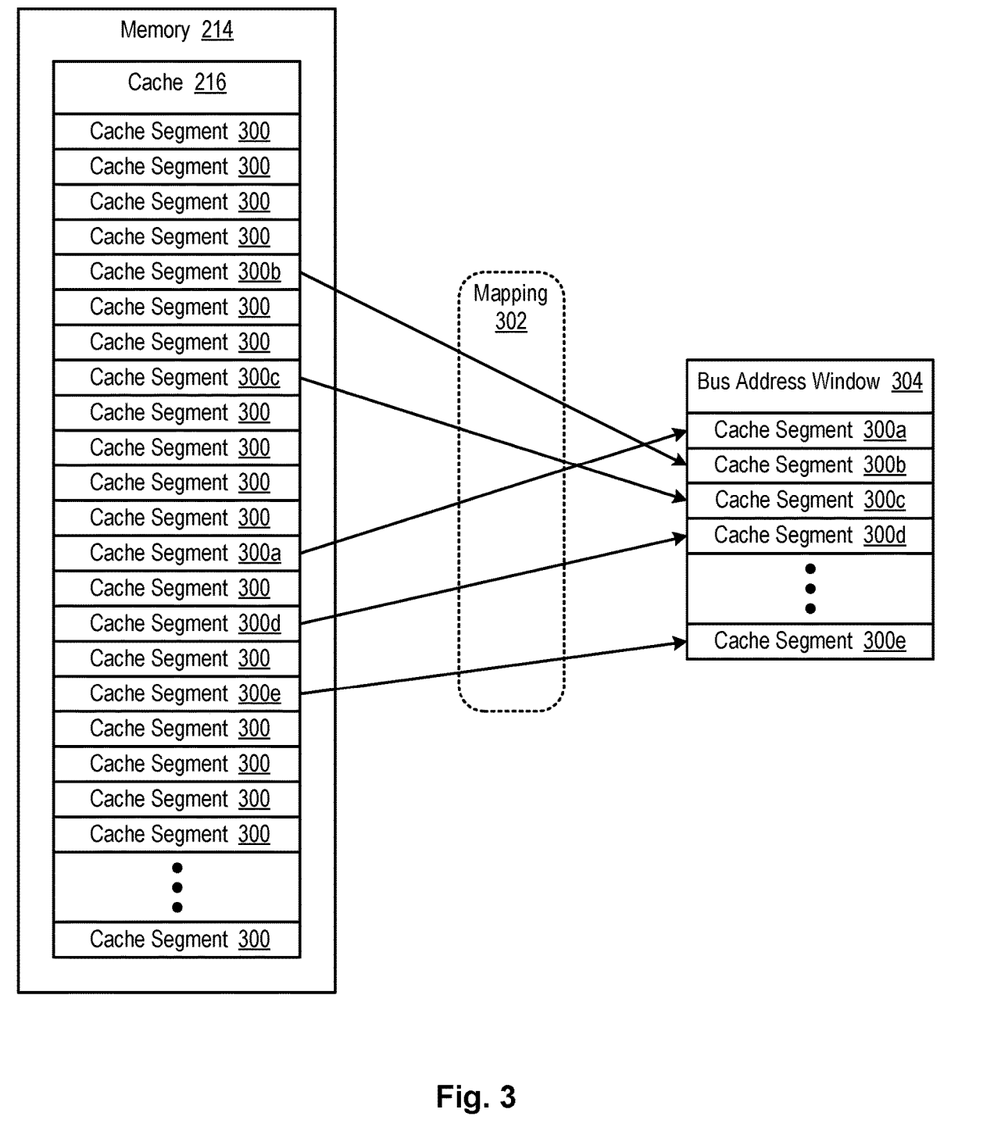
FIG. 3 is a high-level block diagram showing one example of a memory mapping data transfer technique.

Referring to FIG. 3, in general, a Peripheral Component Interconnect (PCI) host bridge may enable communication between a processor and an input/output (I/O) subsystem within a data processing system. The PCI host bridge may provide data buffering capabilities to enable read and write data to be transferred between the processor and the I/O subsystem. The I/O subsystem may be a group of PCI devices (host adapters and/or device adapters) connected to a PCI bus. When a PCI device on the PCI bus originates a read or write command to a system memory via a direct memory access (DMA), the PCI host bridge may translate a PCI address of the DMA to a system memory address of the system memory.

Each PCI device on a PCI bus may be associated with a corresponding translation control entry (TCE) mapping 302 resident within the system memory 214. The TCE mappings 302 may be utilized to perform TCE translations from PCI addresses to system memory addresses. In response to a DMA read or write operation, a corresponding TCE mapping is read by the PCI host bridge to provide a TCE translation.

In storage systems such as the IBM DS8000™ enterprise storage system, each I/O that is processed by the storage system 110 requires mapping cache memory 216 of the storage system 110 one or more times. For example, a read hit to the cache memory 216 requires creation of a TCE mapping 302 so that a host adapter 208 can read the cache memory 216 via a DMA. This TCE mapping 302 is then unmapped after the DMA is complete. In the case of a read miss, two TCE mappings are required: one mapping 302 between the cache memory 216 and a device adapter 210 in order to retrieve the read data from storage drives 204, and a second mapping 302 between the cache memory 216 and a host adapter 208 in order to return the read data to a host system 106. After the DMAs are complete, the TCE mappings 302 may be unmapped.

Figure 4:
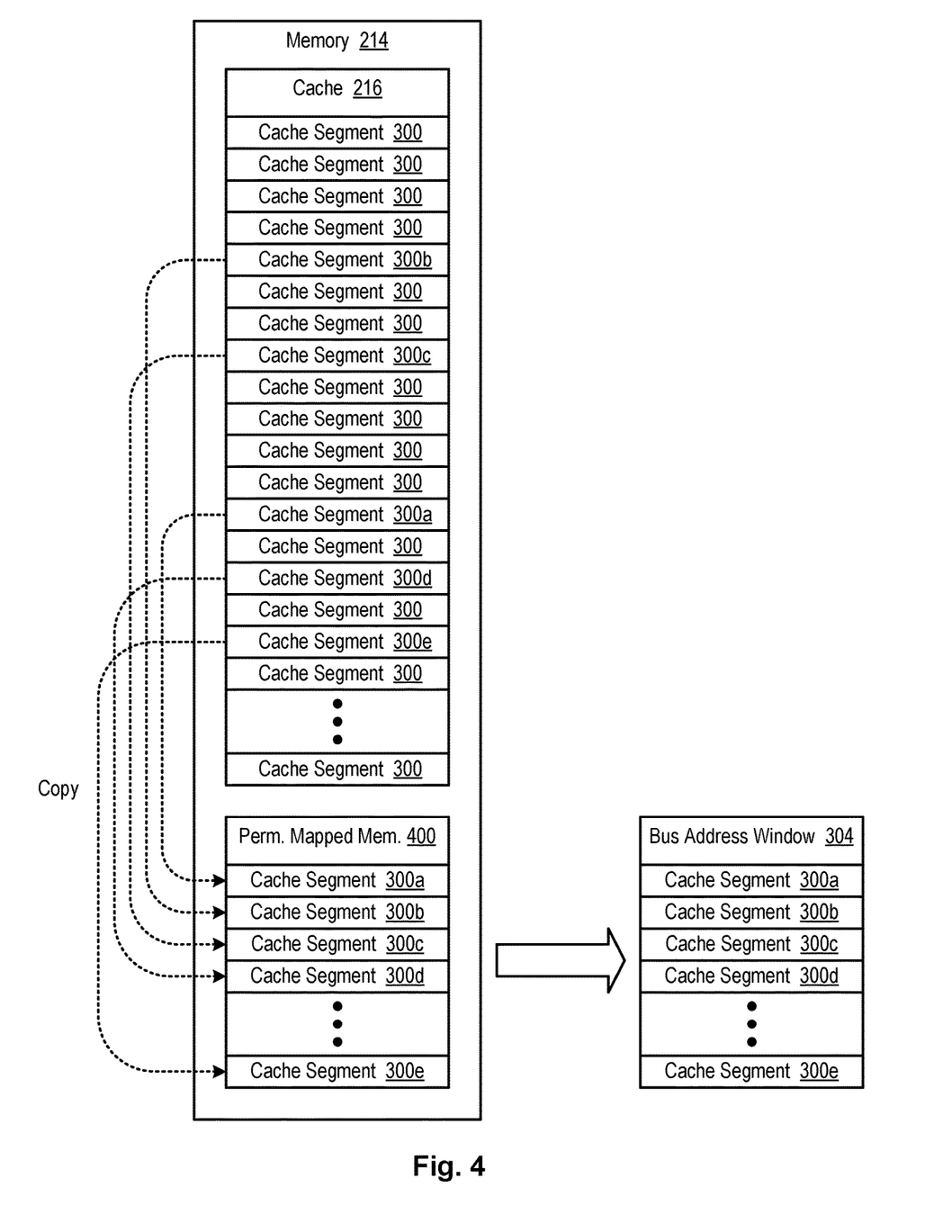
FIG. 4 is a high-level block diagram showing one example of a memory copy data transfer technique.

TCE mapping and unmapping may be costly in terms of time, especially with high I/O rates. One way to circumvent the need for TCE mappings 302 is to keep certain portions of cache memory 216 permanently mapped (i.e., use dedicated permanently mapped memory). When an I/O arrives, requested data may be copied from the cache memory 216 to this permanently mapped memory 400. The DMA may then occur from this permanently mapped memory 400 without needing to perform a TCE mapping/unmapping. This technique eliminates the cost (e.g., time needed) to perform the TCE mapping/unmapping, but introduces the cost (e.g., time needed) to copy data from one memory location to another. This cost may depend on where the two memory locations are relative to one another. Sometimes the cost may be less to perform a TCE mapping/unmapping and other times the cost may be less to copy data to permanently mapped memory 400.

In view of the foregoing, systems and methods are needed to dynamically switch between memory copy and memory mapping data transfer technique to optimize I/O performance in storage systems such as the IBM DS8000™ enterprise storage system. Ideally, depending on the I/O operation involved, such systems and methods will utilize the data transfer technique (i.e., memory copy or memory mapping) that is most efficient.

FIG. 3 is a high-level block diagram showing one example of a memory mapping data transfer technique, such as TCE mapping. As shown, a cache 216 may include one or more cache segments 300, such as four kilobyte cache segments 300. In certain embodiments, a data element such as a "track" may be made up of multiple cache segments 300, such as seventeen cache segments 300. Thus, where a track is made up of seventeen cache segments 300 of four kilobytes each, the track may contain sixty-eight kilobytes of data. In many cases, the cache segments 300 associated with a track may not be contiguous in the cache 216. That is, the cache segments 300 of the track may be sporadically or randomly located in different locations in the cache 216. Thus, to read or write a track (i.e., a contiguous sequence of cache segments 300) in the cache 216, the track may need to be mapped to corresponding cache segments 300. In certain embodiments, a mapping 302 (e.g., a TCE mapping 302) may map cache segments 300 associated with the track to a bus address window 304 so that a host adapter 208 and/or device adapter 210 may transfer the track to/from the cache 216 via DMA. In certain embodiments, the mapping 302 may order the cache segments 300 in the order they are arranged in the track, as shown in FIG. 3.

FIG. 4 is a high-level block diagram showing an example of a memory copy data transfer technique. As shown, instead of mapping cache segments 300 to a bus address window 304, a memory copy data transfer technique may first copy cache segments 300 associated with a data element (e.g., track) to a permanently mapped memory 400. The permanently mapped memory 400 may reside in the same memory 214 (e.g., memory chip) as the cache 216 or in a different memory 214 (e.g., memory chip). Thus, copying the cache segments 300 from the cache 216 to the permanently mapped memory 400 may have some cost, the magnitude of which may vary in accordance with the locations of the cache 216 and the permanently mapped memory 400 and the time needed to copy data therebetween. In certain embodiments, the copied cache segments 300 may be ordered in the permanently mapped memory 400 in the same way they exist in the track, thereby providing a contiguous ordered group of cache segments 300 that can be transferred via DMA by a host adapter 208 and/or device adapter 210.

Figure 5:
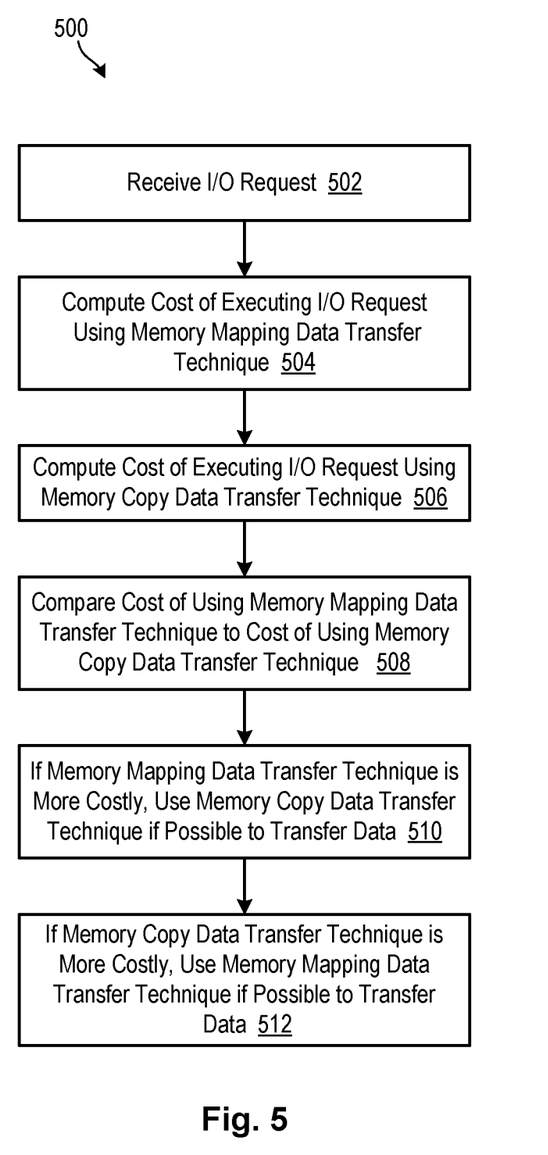
FIG. 5 is a flow diagram showing one embodiment of a method for determining which data transfer technique to use for a particular I/O request.

Referring to FIG. 5, a flow diagram showing one embodiment of a method 500 for determining which data transfer technique to use with respect to a particular I/O request is illustrated. This method 500 may be performed each time an I/O request is received by the storage system 110. As shown, the method 500 initially receives 502 an I/O request. The method 500 then computes 504 a cost associated with executing the I/O request using a memory mapping data transfer technique, such as the memory mapping data transfer technique described in FIG. 3. In certain embodiments, the cost may be calculated 504 by analyzing past statistics to determine how long it typically takes to map and unmap a particular track of data.

The method 500 then computes 506 the cost of executing the I/O request using a memory copy data transfer technique, such as the memory copy data transfer technique described in association with FIG. 4. In certain embodiments, the cost associated with using the memory copy data transfer technique is calculated by determining a number of cache segments 300 to copy to the permanently mapped memory 400. In certain embodiments, the memory copy data transfer technique may be used to copy less than a full track of data whereas the memory mapping data transfer technique may need to map a full track of cache segments 300. Thus, the memory copy data transfer technique may be more efficient with smaller transfers (e.g., less than a full track of data) than the memory mapping data transfer technique. The cost associated with the memory copy data transfer technique may also depend on the relative locations of the cache 216 and the permanently mapped memory 400. If the cache 216 and permanently mapped memory 400 are located on the same memory chip, for example, the cost may be less since the time to copy the data may be shorter. On the other hand, if the cache 216 and permanently mapped memory 400 are located on different memory chips, the cost may be more since the time required to copy the data may be longer.

The method 500 then compares 508 the cost of the memory mapping data transfer technique to the cost of the memory copy data transfer technique. If the cost of the memory mapping data transfer technique is larger, the method 500 may use 510, if possible, the memory copy data transfer technique to transfer data associated with the I/O request to/from the cache 216 to a host adapter 208 and/or device adapter 210. If, on the other hand, the cost of the memory copy data transfer technique is larger, the method 500 may use 512, if possible, the memory mapping data transfer technique to transfer data associated with the I/O request to/from the cache 216 to a host adapter 208 and/or device adapter 210. As will be explained in more detail in association with FIG. 10, use of either the memory mapping or memory copy data transfer technique may depend on whether "mapping" windows or "copy" windows are available to transfer the data. A more detailed embodiment of a method for performing steps 510 and 512 of FIG. 5 will be described in association with FIG. 10.

Figure 6:
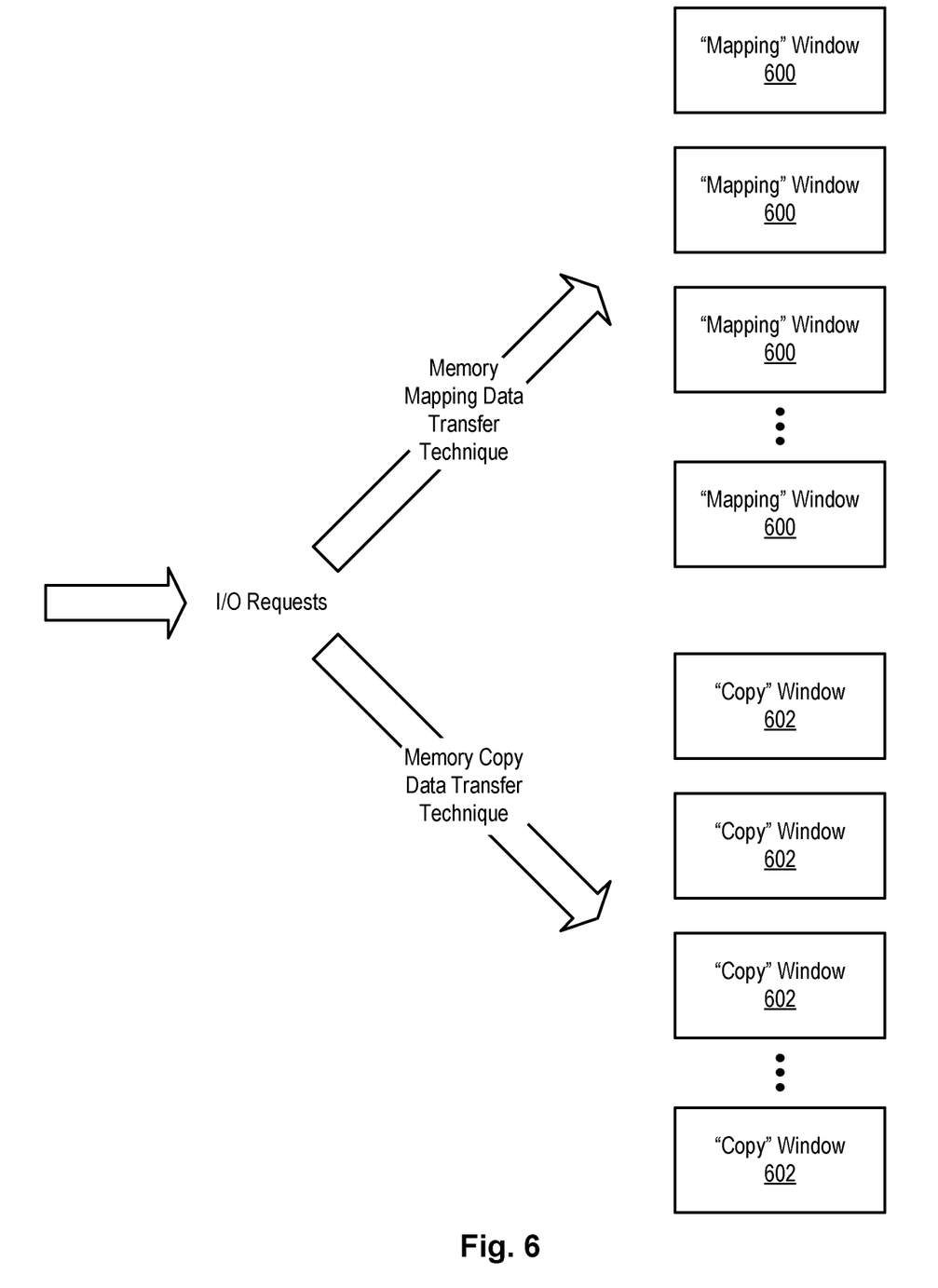
FIG. 6 is a high-level block diagram showing "mapping" windows allocated for use with a memory mapping data transfer technique and "copy" windows allocated for use with a memory copy data transfer technique.

Referring to FIG. 6, in certain embodiments, a specified number of "mapping" windows 600 may be allocated for transferring data using the memory mapping data transfer technique, and a specified number of "copy" windows 602 may be allocated for transferring data using the memory copy data transfer technique. Each "mapping" window may provide a bus address window 304 for transferring data using the memory mapping data transfer technique, and each "copy" window may provide a bus address window 304 for transferring data using the memory copy data transfer technique. As was previously mentioned, a bus address window 304 may provide a way for a host adapter 208 and/or device adapter 210 to read or write a certain amount of contiguous storage space (e.g., a track) on an address bus.

Figure 7:
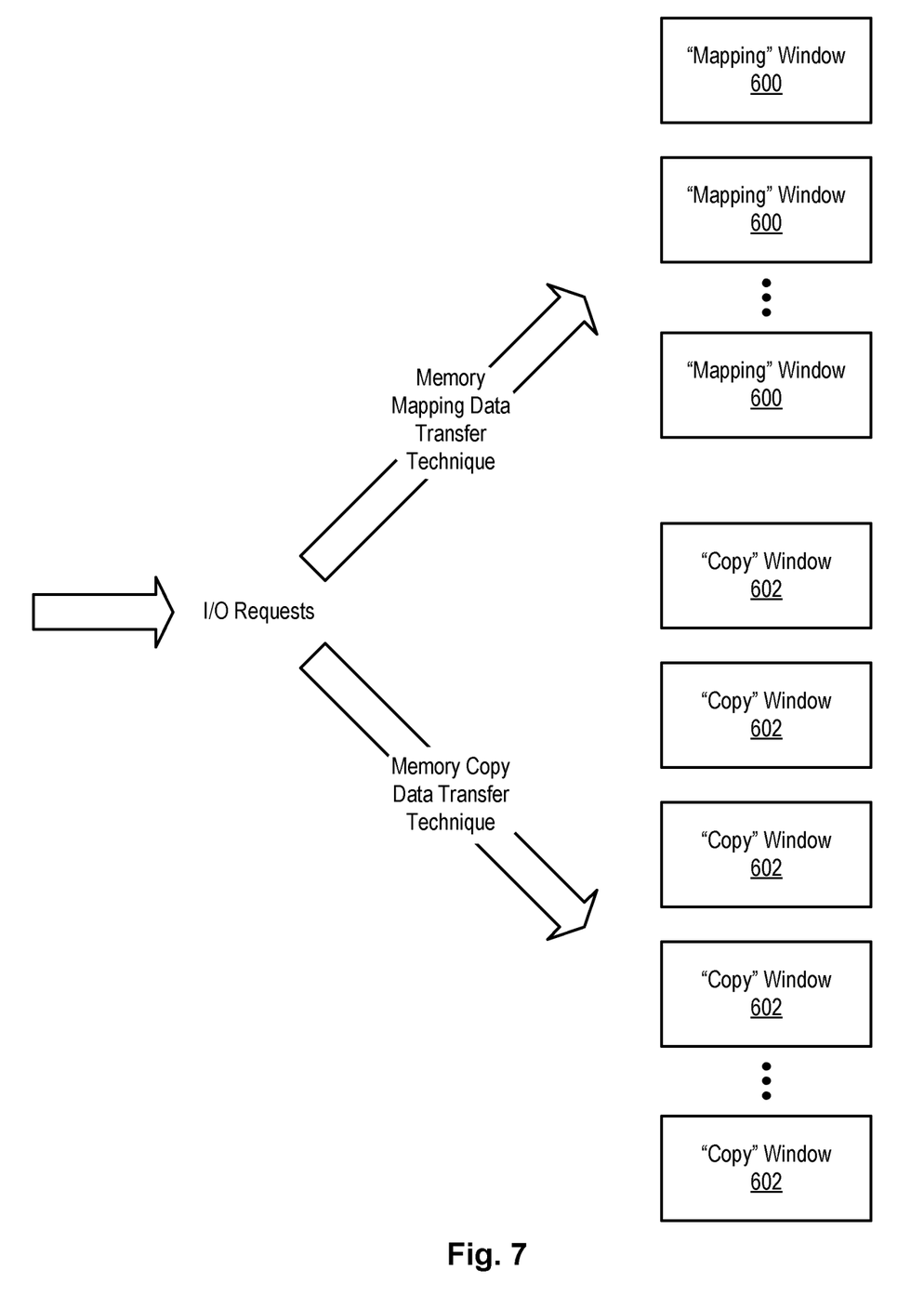
FIG. 7 is a high-level block diagram showing dynamically adjusting a number of "mapping" windows and a number of "copy" windows to promote efficiency when processing I/O requests.

For example, assume that a total of two thousand windows are initially allocated for transferring data and, of these two thousand windows, one thousand are "mapping" windows and the other thousand are "copy" windows. The "mapping" windows may be used to service I/O requests for which the memory mapping data transfer technique is deemed more efficient, and the "copy" windows may be used to service I/O requests for which the memory copy data transfer technique is deemed more efficient. If a certain number of "copy" windows and "mapping" windows are initially allocated for transferring data, systems and methods in accordance with the invention may dynamically adjust the respective number of windows that are allocated to each data transfer technique in accordance with incoming I/O requests. For example, if not enough "copy" windows are available to service incoming I/O requests that are identified to use the memory copy data transfer technique, more of the total windows may be allocated to "copy" windows 602 and less of the total windows may be allocated to "mapping" windows 600, as shown in FIG. 7. In this way, the number of "copy" windows and the number of "mapping" windows may be dynamically changed to correspond to incoming I/O requests.

Figure 8:
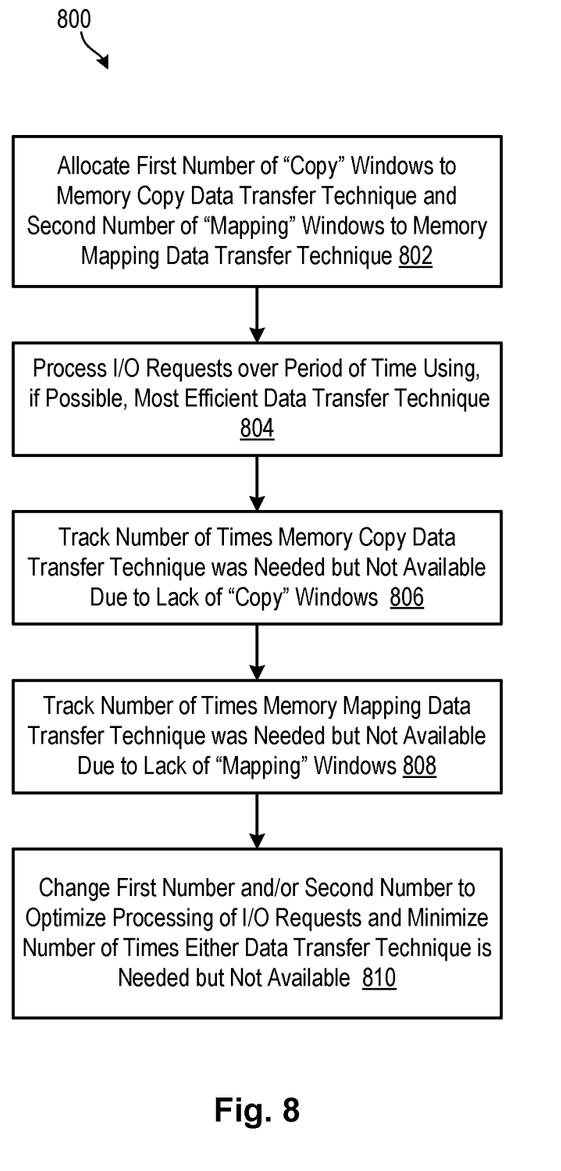
FIG. 8 is a flow diagram showing one embodiment of a method for optimizing a number of "mapping" windows used in association with a memory mapping data transfer technique, and a number of "copy" windows used in association with a memory copy data transfer technique.

Referring to FIG. 8, one embodiment of a method 800 for allocating windows and dynamically changing the allocation of windows is illustrated. As shown, the method 800 initially allocates 802 a first number of "copy" windows to be used in association with the memory copy data transfer technique and a second number of "mapping" windows to be used in association with the memory mapping data transfer technique. In certain embodiments, allocating the windows may include allocating a certain amount of memory 214 to implement the windows. For example, two gigabytes of memory 214 may be allocated to the windows, with one gigabyte allocated to the mappings 302 associated with the memory mapping data transfer technique, and one gigabyte allocated to the permanently mapped memory 400 associated with the memory copy data transfer technique.

In other embodiments, the allocation may include a total number of windows, with a certain proportion of the total windows being "mapping" windows and the remaining proportion of the total windows being "copy" windows. In certain embodiments, the total number of windows or the total amount of memory 214 allocated to windows is fixed. In other embodiments, the total number of windows or the total amount of memory 214 allocated to windows is adjusted as needed. The initial allocation of windows may be based on an estimate or guess of how many are needed or based on statistical data such as the type of I/O that has been received in the past.

Once a first number of "copy" windows and a second number of "mapping" windows have been allocated, the method 800 processes 804 I/O requests over a period of time using, if possible, the most efficient data transfer technique to process the I/O requests. That is, if the memory mapping data transfer technique is deemed to be more efficient to process an I/O request, the method 800 ideally utilizes the memory mapping data transfer technique and an associated "mapping" window to process the I/O request. Similarly, if the memory copy data transfer technique is deemed to be more efficient to process an I/O request, the method 800 ideally utilizes the memory copy data transfer technique and an associated "copy" window to process the I/O request.

While processing the I/O requests, the method 800 tracks 806 the number of times that the memory copy data transfer technique was ideally utilized but was not available due to a lack of associated "copy" windows. Similarly, the method 800 tracks 808 the number of times that the memory mapping data transfer technique was ideally utilized but was not available due to a lack of associated "mapping" windows. Based on the number of times each type of window was unavailable, the method 800 dynamically changes 810 the allocation of "copy" windows and "mapping" windows (e.g., changes the number of "copy" windows relative to the number of "mapping" windows, or increases/decreases the number of "copy" windows and/or "mapping" windows). This may be performed with the goal of minimizing the number of times that windows of a certain type are needed but unavailable.

Figure 9:
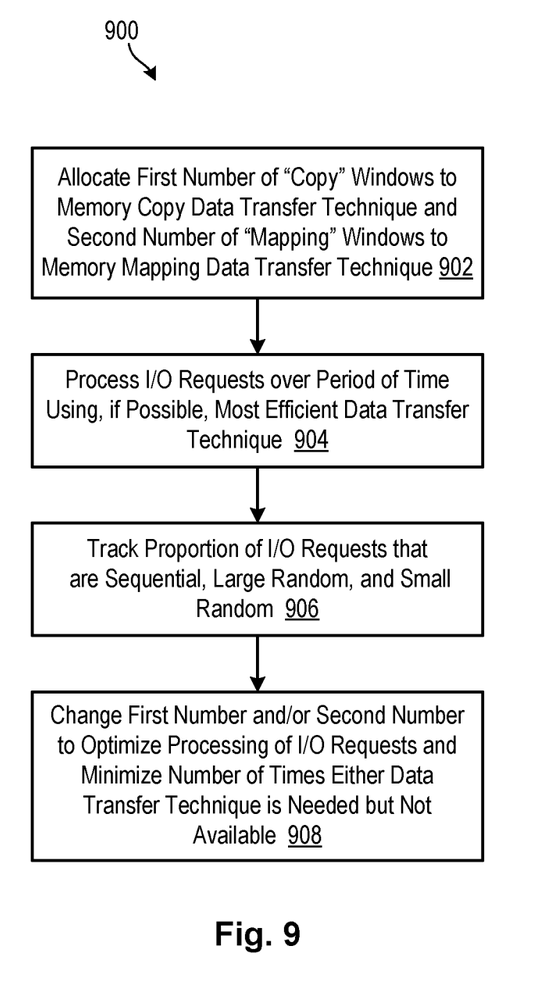
FIG. 9 is a flow diagram showing another embodiment of a method for optimizing a number of "mapping" windows used in association with a memory mapping data transfer technique, and a number of "copy" windows used in association with a memory copy data transfer technique.

Referring to FIG. 9, another embodiment of a method 900 for allocating windows and dynamically changing the allocation of windows is illustrated. As shown, the method 900 initially allocates 902 a first number of "copy" windows to be used in association with the memory copy data transfer technique and a second number of "mapping" windows to be used in association with the memory mapping data transfer technique. Once a first number of "copy" windows and a second number of "mapping" windows are allocated, the method 900 processes 904 I/O requests over a period of time using, if possible, the most efficient data transfer technique to process the I/O requests.

While the I/O requests are being processed, the method 900 tracks 906 the proportion of I/O requests that are of certain types. For example, the method 900 may track 906 what proportion of the I/O requests are sequential I/O requests, large random I/O requests, and small random I/O requests. Sequential I/O requests and large random I/O requests are typically full track accesses and thus may be processed more efficiently using the memory mapping data transfer technique. Small random I/O requests, by contrast, may include less-than-full-track accesses and thus may be processed more efficiently using the memory copy data transfer technique. As was previously explained, the memory copy data transfer technique may be used to copy less than a full track of data whereas the memory mapping data transfer technique may need to map a full track of cache segments 300.

In accordance with the proportion of I/O requests that are of each type, the method 900 may dynamically adjust the number of "copy" windows and the number of "mapping" windows to conform to the composition and type of incoming I/O requests. This may assure, as much as possible, that the most efficient data transfer technique is selected and used for each incoming I/O request.

Figure 10:
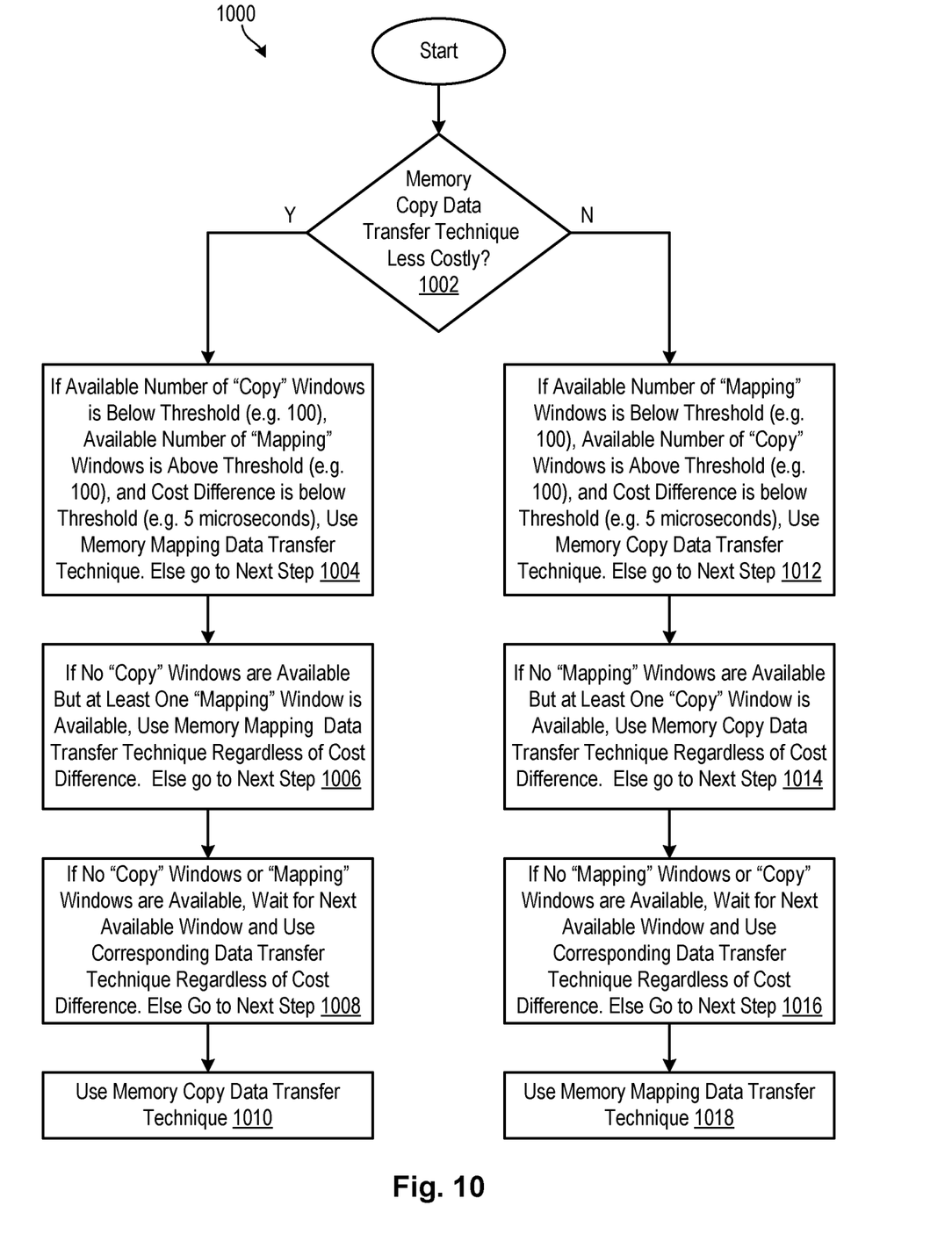
FIG. 10 is a flow diagram showing one embodiment of a method for determining whether to utilize a memory mapping data transfer technique or a memory copy data transfer technique to process an I/O request.

FIG. 10 is a flow diagram showing one embodiment of a method 1000 for determining whether to utilize a memory mapping data transfer technique or a memory copy data transfer technique to process an I/O request. In certain embodiments, this method 1000 is used in place of steps 510, 512 illustrated in FIG. 5. As shown, the method 1000 initially determines 1002, for a received I/O request, whether using the memory copy data transfer technique is less costly than using the memory mapping data transfer technique. If so, the method 1000 determines whether an available number of "copy" windows is below a threshold (e.g., 100), an available number of "mapping" windows is above a threshold (e.g., 100), and a cost difference between using the memory copy data transfer technique and using the memory mapping data transfer technique is below a threshold (e.g., 5 microseconds). If these conditions are satisfied, the method 1000 uses 1004 the memory mapping data transfer technique to transfer data associated with the I/O request. In essence, this step 1004 uses the memory mapping data transfer technique to transfer data associated with the I/O request if "copy" windows are in short supply, "mapping" windows are not in short supply, and the cost difference between the data transfer techniques is not too large. Otherwise, the method 1000 proceeds to the next step 1006.

At step 1006, if no "copy" windows are available but at least one "mapping" window is available, the method 1000 uses 1006 the memory mapping data transfer technique to transfer data associated with the I/O request regardless of the cost difference between using the memory copy data transfer technique and using the memory mapping data transfer technique. In essence, this step 1006 uses the memory mapping data transfer technique to transfer data associated with the I/O request if it is the only option available, even if using the memory copy data transfer technique would be the most efficient. Otherwise, the method 1000 proceeds to the next step 1008.

At step 1008, if no "copy" windows and no "mapping" windows are available, the method 1000 waits 1008 for the next available window ("copy" window or "mapping" window) and uses this window along with the corresponding data transfer technique to transfer the data associated with the I/O request. This is performed regardless of the cost difference between using the memory copy data transfer technique and using the memory mapping data transfer technique. Otherwise, the method 1000 proceeds to the next step 1010. At step 1010, the method 1000 uses the memory copy data transfer technique to transfer data associated with the I/O request since "copy" windows are available and using the memory copy data transfer technique is less costly than using the memory mapping data transfer technique.

If, at step 1002, the memory copy data transfer technique is not less costly than the memory mapping data transfer technique (meaning that the memory mapping data transfer technique is less costly than the memory copy data transfer technique), the method 1000 proceeds to step 1012. At step 1012, the method 1000 determines 1012 whether an available number of "mapping" windows is below a threshold (e.g., 100), an available number of "copy" windows is above a threshold (e.g., 100), and a cost difference between using the memory mapping data transfer technique and using the memory copy data transfer technique is below a threshold (e.g., 5 microseconds). If these conditions are satisfied, the method 1000 uses 1012 the memory copy data transfer technique to transfer data associated with the I/O request. In essence, this step 1012 uses the memory copy data transfer technique to transfer data associated with the I/O request if "mapping" windows are in short supply, "copy" windows are not in short supply, and the cost difference between the data transfer techniques is not too large. Otherwise, the method 1000 proceeds to the next step 1014.

At step 1014, if no "mapping" windows are available but at least one "copy" window is available, the method 1000 uses 1014 the memory copy data transfer technique to transfer data associated with the I/O request regardless of the cost difference between using the memory mapping data transfer technique and using the memory copy data transfer technique. In essence, this step 1014 uses the memory copy data transfer technique to transfer data associated with the I/O request if it is the only option available, even if using the memory mapping data transfer technique would be more efficient. Otherwise, the method 1000 proceeds to the next step 1016.

At step 1016, if no "mapping" windows or "copy" windows are available, the method 1000 waits 1016 for the next available window ("copy" window or "mapping" window) and uses this window along with the corresponding data transfer technique to transfer the data. This is performed regardless of the cost difference between the memory mapping data transfer technique and the memory copy data transfer technique. Otherwise, the method 1000 proceeds to the next step 1018. At step 1018, the method 1000 uses 1018 the memory mapping data transfer technique to transfer data associated with the I/O request since "mapping" windows are available and using the memory mapping data transfer technique is less costly than using the memory copy data transfer technique.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically switching between memory copy and memory mapping data transfer techniques to improve I/O performance, the method comprising:
receiving an I/O request;
computing a cost of executing the I/O request using a memory copy data transfer technique, the memory copy data transfer technique copying cache segments associated with the I/O request from cache memory to a permanently mapped memory, wherein the permanently mapped memory is permanently mapped to a bus address window;
computing a cost of executing the I/O request using a memory mapping data transfer technique, the memory mapping data transfer technique temporarily mapping cache segments associated with the I/O request from the cache memory to the bus address window;
using the memory copy data transfer technique to transfer cache segments associated with the I/O request in the event using the memory copy data transfer technique is less costly than using the memory mapping data transfer technique; and
using the memory mapping data transfer technique to transfer cache segments associated with the I/O request in the event using the memory mapping data transfer technique is less costly than using the memory copy data transfer technique.

2. The method of claim 1, wherein the bus address window is a Peripheral Component Interconnect (PCI) bus address window.

3. The method of claim 1, wherein computing the cost of executing the I/O request using the memory copy data transfer technique comprises calculating a number of cache segments to copy to the permanently mapped memory.

4. The method of claim 1, wherein computing the cost of executing the I/O request using the memory copy data transfer technique comprises determining copy latency between the cache memory and the permanently mapped memory.

5. The method of claim 4, wherein determining the copy latency between the cache memory and the permanently mapped memory comprises determining locations of the cache memory and the permanently mapped memory.

6. The method of claim 1, wherein computing the cost of executing the I/O request using the memory mapping data transfer technique comprises estimating an amount of time needed to at least one of map and unmap cache segments associated with the I/O request from the cache memory to the bus address window.

7. The method of claim 1, wherein the cache segments are not all contiguous in the cache memory.

8. A computer program product for dynamically switching between memory copy and memory mapping data transfer techniques to improve I/O performance, the computer program product comprising a computer-readable medium having computer-usable program code embodied therein, the computer-usable program code configured to perform the following when executed by at least one processor:
receive an I/O request;
compute a cost of executing the I/O request using a memory copy data transfer technique, the memory copy data transfer technique copying cache segments associated with the I/O request from cache memory to a permanently mapped memory, wherein the permanently mapped memory is permanently mapped to a bus address window;
compute a cost of executing the I/O request using a memory mapping data transfer technique, the memory mapping data transfer technique temporarily mapping cache segments associated with the I/O request from the cache memory to the bus address window;
use the memory copy data transfer technique to transfer cache segments associated with the I/O request in the event using the memory copy data transfer technique is less costly than using the memory mapping data transfer technique; and
use the memory mapping data transfer technique to transfer cache segments associated with the I/O request in the event using the memory mapping data transfer technique is less costly than using the memory copy data transfer technique.

9. The computer program product of claim 8, wherein the bus address window is a Peripheral Component Interconnect (PCI) bus address window.

10. The computer program product of claim 8, wherein computing the cost of executing the I/O request using the memory copy data transfer technique comprises calculating a number of cache segments to copy to the permanently mapped memory.

11. The computer program product of claim 8, wherein computing the cost of executing the I/O request using the memory copy data transfer technique comprises determining copy latency between the cache memory and the permanently mapped memory.

12. The computer program product of claim 11, wherein determining the copy latency between the cache memory and the permanently mapped memory comprises determining locations of the cache memory and the permanently mapped memory.

13. The computer program product of claim 8, wherein computing the cost of executing the I/O request using the memory mapping data transfer technique comprises estimating an amount of time needed to at least one of map and unmap cache segments associated with the I/O request from the cache memory to the bus address window.

14. The computer program product of claim 8, wherein the cache segments are not all contiguous in the cache memory.

15. A system for dynamically switching between memory copy and memory mapping data transfer techniques to improve I/O performance, the system comprising:
at least one processor;
at least one memory device coupled to the at least one processor and storing instructions for execution on the at least one processor, the instructions causing the at least one processor to:
receive an I/O request;
compute a cost of executing the I/O request using a memory copy data transfer technique, the memory copy data transfer technique copying cache segments associated with the I/O request from cache memory to a permanently mapped memory, wherein the permanently mapped memory is permanently mapped to a bus address window;
compute a cost of executing the I/O request using a memory mapping data transfer technique, the memory mapping data transfer technique temporarily mapping cache segments associated with the I/O request from the cache memory to the bus address window;
use the memory copy data transfer technique to transfer cache segments associated with the I/O request in the event using the memory copy data transfer technique is less costly than using the memory mapping data transfer technique; and
use the memory mapping data transfer technique to transfer cache segments associated with the I/O request in the event using the memory mapping data transfer technique is less costly than using the memory copy data transfer technique.

16. The system of claim 15, wherein the bus address window is a Peripheral Component Interconnect (PCI) bus address window.

17. The system of claim 15, wherein computing the cost of executing the I/O request using the memory copy data transfer technique comprises calculating a number of cache segments to copy to the permanently mapped memory.

18. The system of claim 15, wherein computing the cost of executing the I/O request using the memory copy data transfer technique comprises determining copy latency between the cache memory and the permanently mapped memory.

19. The system of claim 18, wherein determining the copy latency between the cache memory and the permanently mapped memory comprises determining locations of the cache memory and the permanently mapped memory.

20. The system of claim 15, wherein computing the cost of executing the I/O request using the memory mapping data transfer technique comprises estimating an amount of time needed to at least one of map and unmap cache segments associated with the I/O request from the cache memory to the bus address window.

\* \* \* \* \*